United States Patent
Jung et al.

(10) Patent No.: US 9,777,647 B2
(45) Date of Patent: Oct. 3, 2017

(54) METHOD FOR CONTROLLING CREEP TORQUE OF MOTOR-DRIVEN VEHICLE

(71) Applicants: Hyundai Motor Company, Seoul (KR); Kia Motors Corp., Seoul (KR)

(72) Inventors: Jae Won Jung, Seoul (KR); Kang Sik Jeon, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 995 days.

(21) Appl. No.: 14/051,871

(22) Filed: Oct. 11, 2013

(65) Prior Publication Data

US 2014/0358402 A1    Dec. 4, 2014

(30) Foreign Application Priority Data

May 29, 2013    (KR) .................. 10-2013-0060919

(51) Int. Cl.
| | |
|---|---|
| *B60L 9/00* | (2006.01) |
| *G05D 1/00* | (2006.01) |
| *G06F 7/00* | (2006.01) |
| *F02D 29/02* | (2006.01) |
| *B60L 15/20* | (2006.01) |

(52) U.S. Cl.
CPC .......... *F02D 29/02* (2013.01); *B60L 15/2063* (2013.01); *B60L 15/2081* (2013.01); *B60L 2240/423* (2013.01); *B60L 2240/642* (2013.01); *Y02T 10/645* (2013.01); *Y02T 10/72* (2013.01); *Y02T 10/7275* (2013.01); *Y02T 10/7291* (2013.01); *Y02T 90/16* (2013.01)

(58) Field of Classification Search
None
See application file for complete search history.

(56) References Cited

U.S. PATENT DOCUMENTS

| | | | | |
|---|---|---|---|---|
| 6,253,144 | B1* | 6/2001 | Yamamura | B60K 31/0008 180/169 |
| 2003/0171186 | A1* | 9/2003 | Okada | B60K 31/04 477/71 |
| 2009/0112432 | A1* | 4/2009 | Ueoka | B60T 7/122 701/70 |
| 2011/0029172 | A1* | 2/2011 | Kwon | B60L 15/2009 701/22 |
| 2012/0150384 | A1* | 6/2012 | Jung | B60W 30/18063 701/31.1 |

FOREIGN PATENT DOCUMENTS

| | | |
|---|---|---|
| JP | 2001-310654 A | 11/2001 |
| KR | 10-0535417 B1 | 12/2005 |
| KR | 10-2009-0008753 A | 1/2009 |
| KR | 10-2011-0012161 A | 2/2011 |
| KR | 10-2012-0080720 A | 7/2012 |
| KR | 10-2013-0009083 A | 1/2013 |
| KR | 10-2013-0011521 A | 1/2013 |
| KR | 10-1230903 B1 | 2/2013 |

* cited by examiner

*Primary Examiner* — Bhavesh V Amin
(74) *Attorney, Agent, or Firm* — McDermott Will & Emery LLP

(57) ABSTRACT

A method for controlling a creep torque of a motor-driven vehicle includes a gradient calculating step of calculating a gradient of a traveling road, and a time constant calculating step of calculating a time constant of a filter using the gradient, a preset basic creep torque, and a sliding speed limiting value. A variable controlling step substitutes the calculated time constant for the time constant of the filter, inputs the basic creep torque to the filter, and controls the motor using a torque value output from the filter as a demanded torque.

5 Claims, 5 Drawing Sheets

METHOD FOR CONTROLLING CREEP TORQUE OF MOTOR-DRIVEN VEHICLE

CROSS REFERENCE TO RELATED APPLICATION

This application claims under 35 U.S.C. §119(a) the benefit of Korean Patent Application No. 10-2013-0060919 filed on May 29, 2013, the entire contents of which are incorporated herein by reference.

TECHNICAL FIELD

The present disclosure relates to a method for controlling a creep torque of a motor-driven vehicle so that the motor-driven vehicle is not excessively slid backward on a ramp, or the like.

BACKGROUND

Since an electric motor-driven vehicle, such as an electric vehicle, a hybrid vehicle, a fuel cell vehicle, or the like, does not have an idle torque unlike an engine vehicle, a separate control for creep driving is required.

In addition, when a step control is performed at the time of applying a creep torque, it does not provide comfortable driving feeling. Therefore, filtering allows a torque to be smoothly output to a motor. However, when calculating a time constant for the filtering, determining the time constant of a creep torque control has a following trade-off.

1. The time constant is decreased for a smooth creep start of the vehicle (particularly, in a going-up situation).

2. The time constant is increased in order to decrease rapid acceleration feeling at the time of starting the vehicle and to decrease creep noise at the time of braking the vehicle (particularly, in flatland and going-down situations).

Therefore, the greater the time constant, the greater the amount of sliding at the time of starting the vehicle on a ramp under insufficiency of the creep torque is produced.

The matters described as the related art have been provided only for assisting in the understanding for the background of the present disclosure and should not be considered as corresponding to the related art known to those skilled in the art.

SUMMARY

An aspect of the present disclosure provides a method for controlling a creep torque of a motor-driven vehicle so that the motor-driven vehicle is not excessively slid backward on a ramp, or the like.

According to an exemplary embodiment of the present disclosure, a method for controlling a creep torque of a motor-driven vehicle includes a gradient calculating step of calculating a gradient of a traveling road, and a time constant calculating step of calculating a time constant of a filter using the gradient, a preset basic creep torque, and a sliding speed limiting value. A variable controlling step substitutes the calculated time constant for the time constant of the filter, inputs the basic creep torque to the filter, and controls the motor using a torque value output from the filter as a demanded torque.

The method may further include, before the time constant calculating step, a basic controlling step of controlling the motor depending on the preset basic creep torque.

The time constant may be smaller than a maximum time constant value calculated by the following Equation:

$$\text{Maximum time constant value} = \left\{ \left( \frac{AT - Mg\theta}{M} \right) \ln\left( \frac{AT}{AT - Mg\theta} \right) - g\theta \right\}^{-1} v_{back}$$

(Where A indicates a gear ratio/tire radius, T indicates the basic creep torque, M indicates a vehicle weight, g indicates a gravitational acceleration, $\theta$ indicates the gradient, and v_back indicates the sliding speed limiting value.)

In the variable controlling step, the calculated time constant may substitute for the time constant of the filter, the basic creep torque may be multiplied by a gear ratio/tire radius to calculate a basic gradability, the basic gradability may be input to the filter, and the motor may be controlled using a required gradability output from the filter.

In the variable controlling step, gravity may be removed from the required gradability to calculate a final gradability, and the motor may be controlled using the final gradability.

The gravity may be calculated by multiplying a vehicle weight, a gravitational acceleration, and a gradient by one another.

The filter may be represented by the following Equation:

$$H(s) = \frac{1}{k.s + 1}$$

(where k indicates the time constant).

DETAILED DESCRIPTION

Hereinafter, a method for controlling a creep torque of a motor-driven vehicle according to an exemplary embodiment of the present disclosure will be described with reference to the accompanying drawings.

Figure 1:
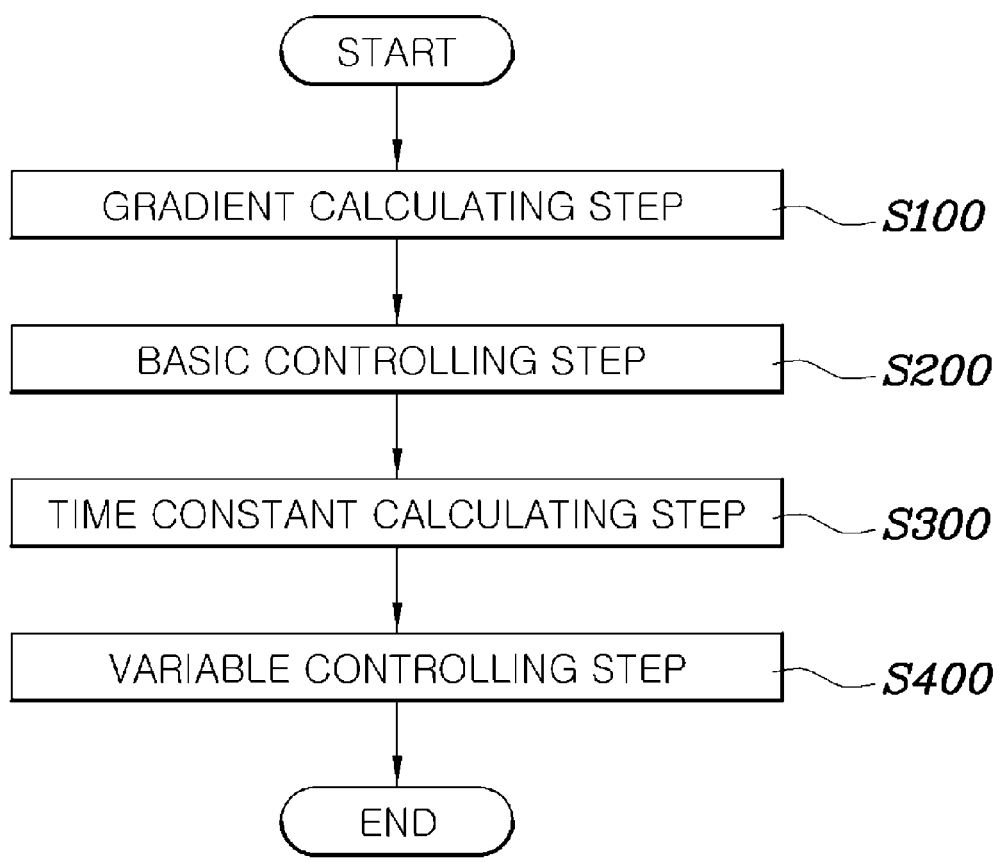
FIG. 1 is a flow chart of a method for controlling a creep torque of a motor-driven vehicle according to an exemplary embodiment of the present disclosure.
Figure 2:
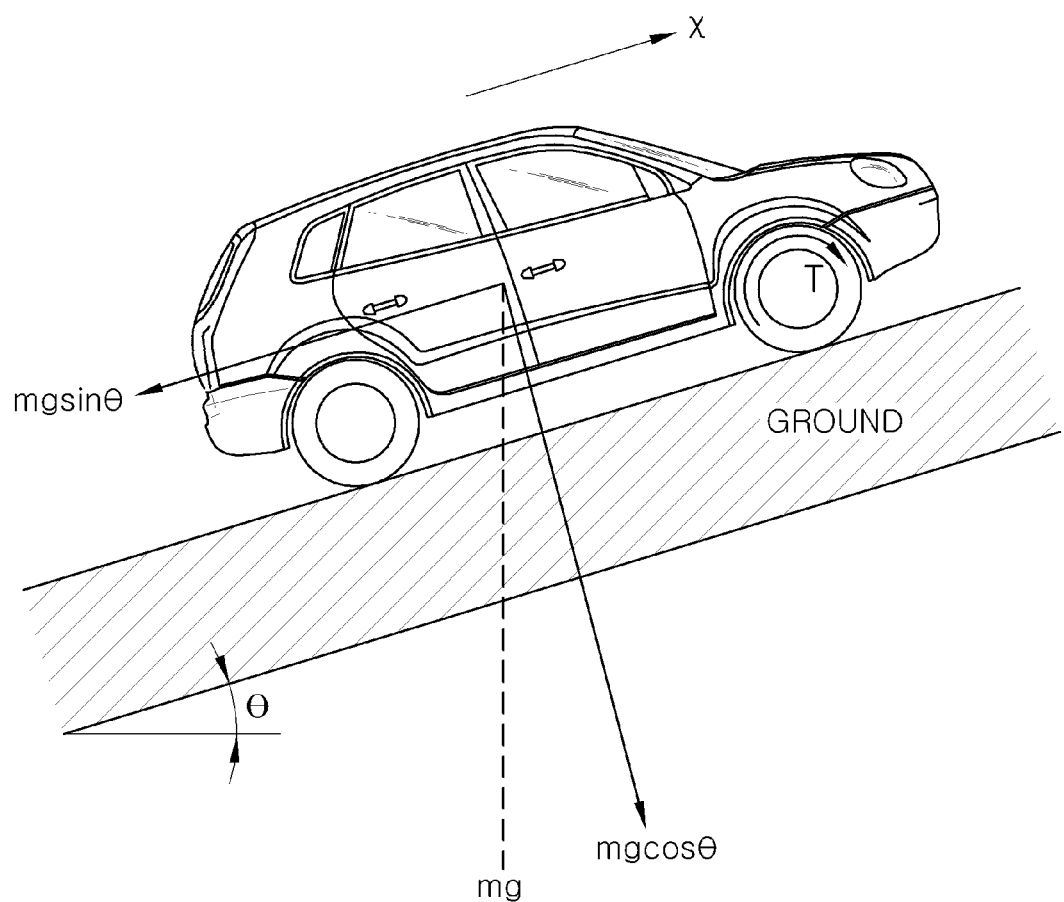
FIG. 2 is a view for describing a method for controlling a creep torque of a motor-driven vehicle according to an exemplary embodiment of the present disclosure.
Figure 3:
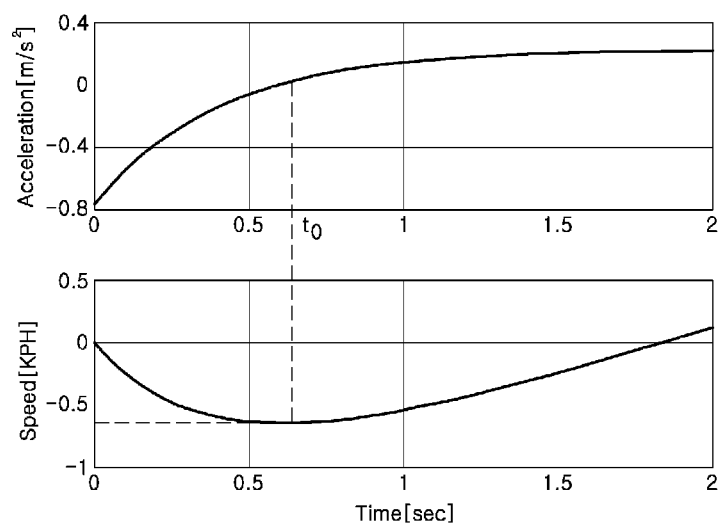
FIG. 3 is a graph for describing a sliding speed limiting value of the method for controlling a creep torque of a motor-driven vehicle according to an exemplary embodiment of the present disclosure.
Figure 4:
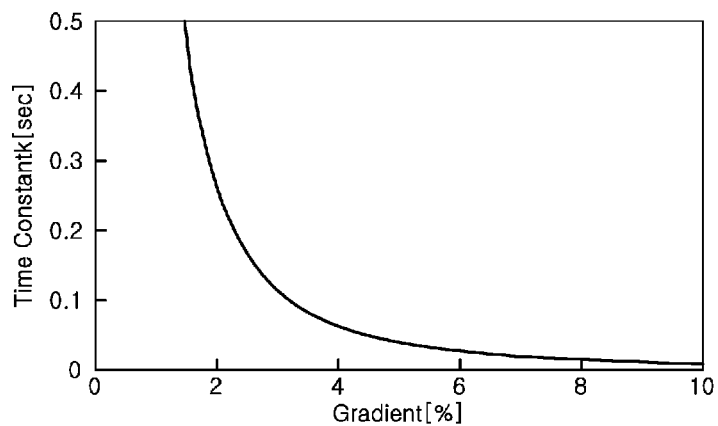
FIG. 4 is a graph for describing a time constant of a method for controlling a creep torque of a motor-driven vehicle according to an exemplary embodiment of the present disclosure.
Figure 5:
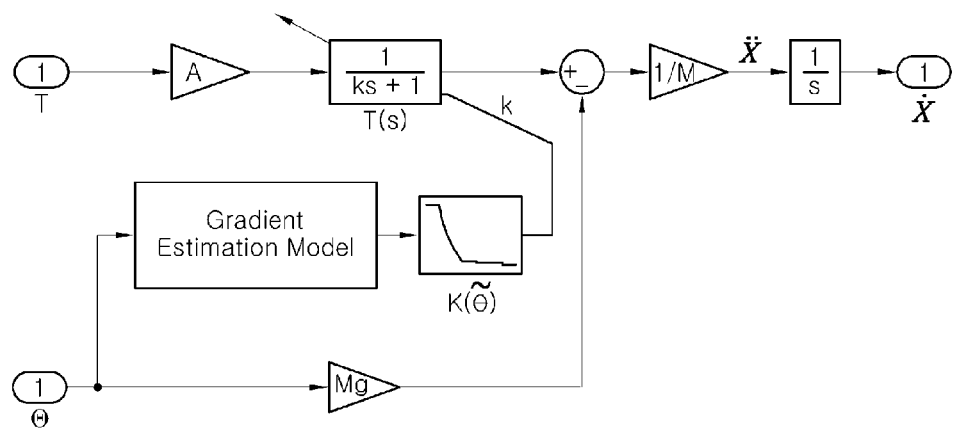
FIG. 5 is a block diagram of a method for controlling a creep torque of a motor-driven vehicle according to an exemplary embodiment of the present disclosure.
Figure 6:
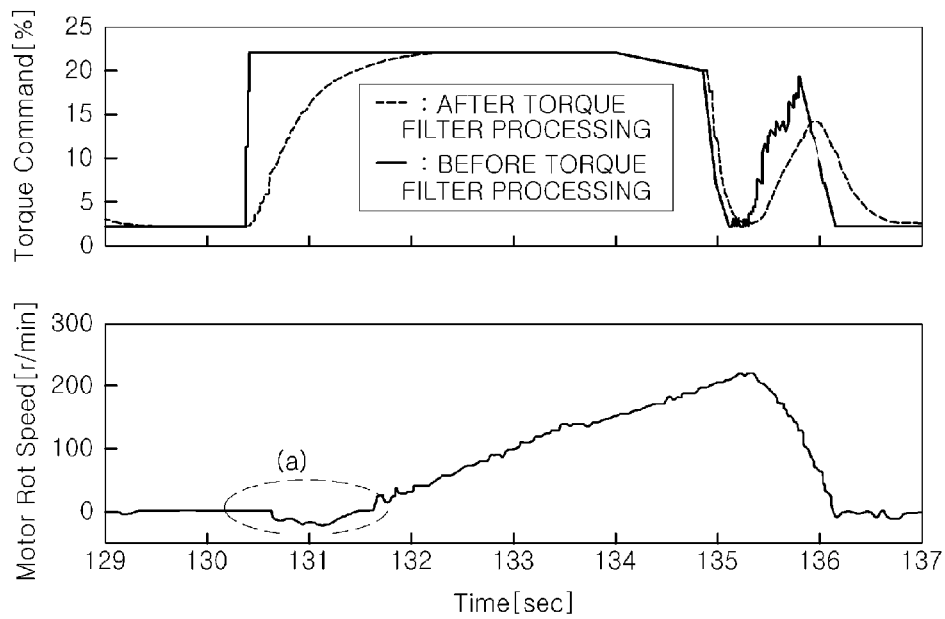
FIGS. 6 and 7 are graphs of comparing effects of a method for controlling a creep torque of a motor-driven vehicle according to an exemplary embodiment of the present disclosure with each other.
Figure 7:
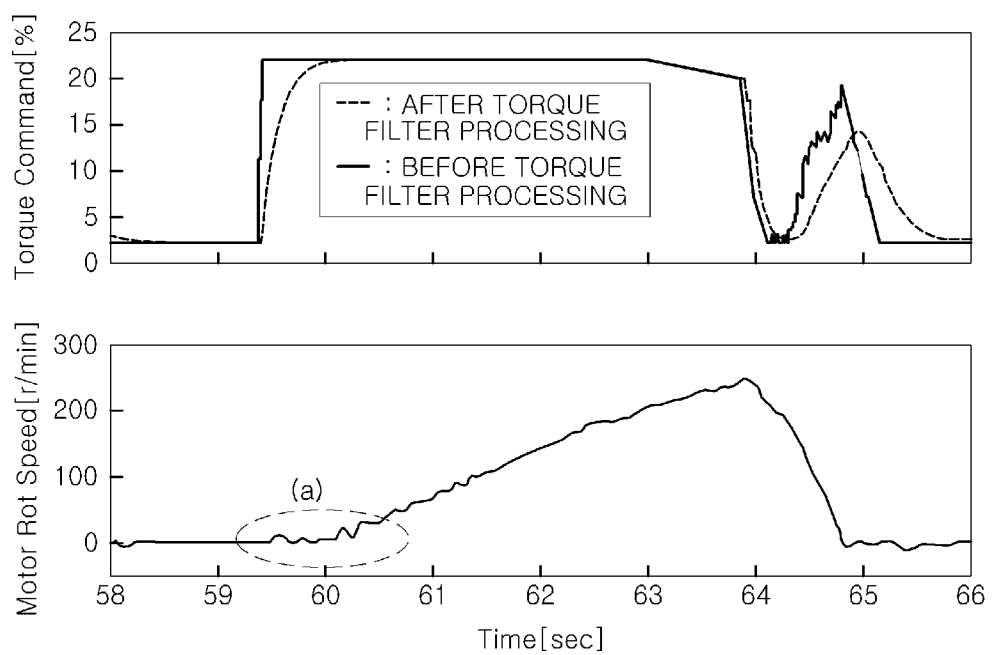

FIG. 1 is a flow chart of a method for controlling a creep torque of a motor-driven vehicle according to an exemplary embodiment of the present disclosure. FIG. 2 is a view for describing a method for controlling a creep torque of a motor-driven vehicle according to an exemplary embodiment of the present disclosure. FIG. 3 is a graph for describing a sliding speed limiting value of a method for controlling a creep torque of a motor-driven vehicle according to an exemplary embodiment of the present disclosure. FIG. 4 is a graph for describing a time constant of a method for controlling a creep torque of a motor-driven vehicle according to an exemplary embodiment of the present disclosure. FIG. 5 is a block diagram of a method for controlling a creep torque of a motor-driven vehicle according to an exemplary embodiment of the present disclosure. FIGS. 6 and 7 are graphs of comparing effects of a method for controlling a creep torque of a motor-driven vehicle according to an exemplary embodiment of the present disclosure with each other.

The present disclosure relates to a method for controlling a creep torque of a motor-driven vehicle so that the motor-driven vehicle is not excessively slid backward on a ramp, or the like. The method for controlling a creep torque of a motor-driven vehicle according to an exemplary embodiment of the present disclosure includes a gradient calculating step (S100) of calculating a gradient of a traveling road, and a time constant calculating step (S300) of calculating a time constant of a filter using the gradient, a preset basic creep torque, and a sliding speed limiting value. A variable controlling step (S400) substitutes the calculated time constant for the time constant of the filter, inputs the basic creep torque to the filter, and controls the motor using a torque value output from the filter as a demanded torque.

Referring to FIG. 1, the method for controlling a creep torque of a motor-driven vehicle according to an exemplary embodiment of the present disclosure may further include, before the time constant calculating step (S300), a basic controlling step (S200) of controlling the motor depending on the present basic creep torque.

In general, the motor-driven vehicle outputs an artificial creep torque from the motor to secure safety on a going-up road, or the like. If the creep torque is uniformly processed and output, different driving sensation may be perceived as compared with an internal combustion engine vehicle according to the related art depending on the circumstances.

Thus, the gradient of the traveling road is first calculated. The gradient may be calculated using a G sensor, an altitude value of a precise map, or the like. After the basic creep torque is pre-stored, the motor is controlled using the basic creep torque when the gradient is a predetermined value or higher.

The basic creep torque graph changes depending on the calculated gradient to control the motor. To this end, the time constant of the filter is calculated using the basic creep torque, the gradient, and the preset sliding speed limiting value. The time constant may also be calculated and deduced in real time in Equation 1 below or be deduced by preparing a data map and substituting the basic creep torque, the gradient, and the preset sliding speed limiting value to the data map.

The time constant calculated as described above is substituted into the filter, the basic creep torque is input to the filter, and the motor is controlled using the torque value output from the filter as the demanded torque, thereby making it possible to adjust a degree of sensibility at which the basic creep torque is converged on a target value depending on the circumstances of the gradient. More specifically, when the vehicle is on a sloping road as shown in FIG. 2, it may be modeled with Equation 1.

$$M\ddot{x} = \sum F = -Mg\sin\theta + T\frac{GR}{R_{tire}} \qquad \text{[Equation 1]}$$

$$\ddot{x} = \frac{1}{M}(-Mg\sin\theta + AT)(\leftarrow A = GR/R_{tire})$$

$$\cong \frac{1}{M}(-Mg\theta + AT)(\leftarrow \sin(x) \cong x)$$

(Where A indicates a gear ratio (GR)/tire radius (R_tire), T indicates a basic creep torque, M indicates a vehicle weight, g indicates a gravitational acceleration, and θ indicates a gradient.)

Driving force for maintaining the vehicle at least in a stop state on the going-up road may be calculated by the Equation 1 described above, thus reversely calculating a driving torque required in the motor.

FIG. 5 is a block diagram of a method for controlling a creep torque of a motor-driven vehicle according to an exemplary embodiment of the present disclosure. In the exemplary embodiment of the present disclosure, θ, which is the gradient, is first measured and is estimation-modeled, and the time constant is calculated from the estimation-modeled value.

Then, the time constant is substituted into the filter, and the product of the basic creep torque and A (the gear ratio (GR)/tire radius (R_tire)) is substituted into the filter to calculate a required gradability.

Gravity may be removed from the required gradability to calculate a final gradability, and the motor may be controlled using the final gradability. When the final gradability is divided by A, a driving torque required in the motor may be calculated, and a torque control may be performed in the motor through the driving torque.

The time constant may be smaller than a maximum time constant value calculated by the Equation 2 below.

$$\left\{\left(\frac{AT - Mg\theta}{M}\right)\ln\left(\frac{AT}{AT - Mg\theta}\right) - g\theta\right\}^{-1} v_{back} \qquad \text{[Equation 2]}$$

(Where A indicates a gear ratio/tire radius, T indicates a basic creep torque, M indicates a vehicle weight, g indicates a gravitational acceleration, θ indicates a gradient, and v_back indicates a sliding speed limiting value.)

The time constant may be selected within the maximum value. For example, the maximum value itself may be used as the time constant or a value decreased from the maximum value in a predetermined ratio may be used as the time constant, depending on a vehicle feature.

More specifically, a vehicle going-up is modeled with the Equation 3 below. When this is subjected to inverse Laplace transformation into a time domain, it is represented with the Equation 3.

$$\dot{X}(s) = \frac{1}{M}\left\{-Mg\Theta(s) + \left(\frac{A}{ks+1}\right)T(s)\right\} \qquad \text{[Equation 3]}$$

$$= -\frac{g\theta}{s} + \left(\frac{A}{ks+1}\right)\frac{T}{s}$$

$$\dot{x}(t) = -g\theta + \frac{AT}{M} - \frac{AT}{M}e^{-\frac{t}{k}}$$

Referring to FIG. 3, when an experiment is performed under a predetermined condition, the minimum speed appears at a point t0 at which an acceleration is 0 when the vehicle starts on the going-up road. That is, when the vehicle restarts in a state in which it is stopped on the going-up road, the vehicle is initially slid slightly backward, and the maximum speed at which the vehicle is slid is generated at which the acceleration is 0. Then, the acceleration again has a positive value, such that a speed is also increased in a positive direction, that is, a direction in which the vehicle goes up a hill.

Therefore, when a desired sliding speed limiting value on the going-up road is determined, a time constant appropriate for the sliding speed limiting value may be reversely found. More specifically, this process may be understood by Equation 4.

$$\ddot{x}(t_0) = -g\theta + \frac{AT}{M} - \frac{AT}{M}e^{-\frac{t_0}{k}} = 0 \quad \text{[Equation 4]}$$

$$\Rightarrow t_0 = k \cdot \ln\left(\frac{AT}{AT - Mg\theta}\right)$$

That is, t0 at which the acceleration is 0 is calculated. In addition, the time constant is calculated under the condition that a result obtained by substituting the value of t0 into a function of the speed is smaller than the sliding speed limiting value.

$$\dot{x}(t_0) = \left(\frac{AT - mg\theta}{M}\right)k \cdot \ln\left(\frac{AT}{AT - Mg\theta}\right) - kg\theta \geq v_{back} \quad \text{[Equation 5]}$$

$$\Rightarrow k \leq \left\{\left(\frac{AT - Mg\theta}{M}\right)\ln\left(\frac{AT}{AT - Mg\theta}\right)g\theta\right\}^{-1} v_{back}$$

Maximum time constant value =

$$\left\{\left(\frac{AT - Mg\theta}{M}\right)\ln\left(\frac{AT}{AT - Mg\theta}\right) - g\theta\right\}^{-1} v_{back}$$

(Where A indicates a gear ratio/tire radius, T indicates a basic creep torque, M indicates a vehicle weight, g indicates a gravitational acceleration, θ indicates a gradient, and v_back indicates a sliding speed limiting value.)

When the maximum value of the time constant under the condition of the desired sliding speed limiting value is applied, a sudden application of the torque is prevented without allowing the vehicle to be slid backward in the above-mentioned scheme, thereby making it possible to provide the optimal performance and driving feeling. FIG. 4 is a graph showing a change in a time constant depending on this gradient.

In the variable controlling step, the calculated time constant may be substituted for the time constant of the filter, the basic creep torque may be multiplied by the gear ratio/tire radius to calculate a basic gradability, the basic gradability may be input to the filter, and the motor may be controlled using a required gradability output from the filter. In addition, in the variable controlling step, the gravity may be removed from the required gradability to calculate the final gradability, and the motor may be controlled using the final gradability. The gravity may be calculated by multiplying the vehicle weight, the gravitational acceleration, and the gradient by one another, and a transfer function (H(s)) of the filter may be represented with the Equation 6.

$$\frac{1}{k.s + 1} \quad \text{[Equation 6]}$$

FIGS. 6 and 7 are graphs of comparing effects of a method for controlling a creep torque of a motor-driven vehicle according to an exemplary embodiment of the present disclosure with each other. FIG. 6 shows the case in which the vehicle is driven without a change in a time constant, and FIG. 7 shows the vehicle is driven while appropriately changing the time constant according to an exemplary embodiment of the present disclosure. It could be confirmed from the graphs of FIGS. 6 and 7 that a speed at which a torque is converged on a target torque is changed depending on a change in a time constant and a rotational speed of the motor does not appear as a negative value in a section (a) in the present disclosure, such that the vehicle does not slide backward.

With the method for controlling a creep torque of a motor-driven vehicle as described above, the time constant is varied depending on a gradient to generate an optimal creep torque, thereby providing comfortable driving feeling and safety.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. A method for controlling a creep torque of a motor-driven vehicle, comprising:
   a gradient calculating step of calculating a gradient of a traveling road using a sensor;
   a time constant calculating step of calculating a time constant of a filter using the gradient, a preset basic creep torque, and a sliding speed limiting value; and
   a variable controlling step of inputting the calculated time constant and the preset basic creep torque to the filter, and controlling an electric motor, by an electronic control unit, using a torque value output from the filter as a demanded torque,
   wherein the calculated time constant is smaller than a maximum time constant value that is calculated by the following Equation:

maximum time constant value =

$$\left\{\left(\frac{AT - Mg\theta}{M}\right)\ln\left(\frac{AT}{AT - Mg\theta}\right) - g\theta\right\}^{-1} v_{back},$$

wherein A indicates a gear ratio/tire radius, T indicates the preset basic creep torque, M indicates a vehicle weight, g indicates a gravitational acceleration, θ indicates the gradient, and v_back indicates the sliding speed limiting value, and
wherein a transfer function (H(s)) of the filter is represented by the following Equation:

$$H(s) = \frac{1}{ks + 1},$$

wherein k indicates the calculated time constant.

2. The method of claim 1, further comprising, before the time constant calculating step, a basic controlling step of controlling the motor depending on the preset basic creep torque.

3. The method of claim 1, wherein in the variable controlling step, the calculated time constant substitutes for the time constant of the filter, the preset basic creep torque is multiplied by a gear ratio/tire radius to calculate a basic gradability, the basic gradability is input to the filter, and the motor is controlled using a required gradability output from the filter.

4. The method of claim 3, wherein in the variable controlling step, gravity is removed from the required gradability to calculate a final gradability, and the motor is controlled using the final gradability.

5. The method of claim 4, wherein the gravity is calculated by multiplying a vehicle weight, a gravitational acceleration, and the gradient by one another.

* * * * *